July 24, 1956  E. E. FRANKE  2,756,005
LOADING DEVICE FOR A ROLL FILM DEVELOPING TANK
Filed Feb. 12, 1953

INVENTOR.
Eric E. Franke

2,756,005

LOADING DEVICE FOR A ROLL FILM DEVELOPING TANK

Eric E. Franke, Brooklyn, N. Y.

Application February 12, 1953, Serial No. 336,573

4 Claims. (Cl. 242—77)

The present invention relates to a loading device for a roll film developing tank.

The tanks used for development of roll film are either made from a plastic composition or from metal, preferably stainless steel. In order to place the film which may be five feet or more in length, inside a small, round tank, the film must be spirally wound without the loops touching each other. Several principles are used for loading the tanks. In one case a plain spool is used in conjunction with a plastic apron which has indentations and projections alternating along the edges. The end of the apron and the end of the film are secured under a spring clip at the core of the spool and the apron and film are then wound together onto the spool. The projections and indentations at the edges of the apron keep the successive loops of the film from touching each other and permit access of the developer and the fixing bath to the film. A second type of tank is equipped with a reel, usually made from a plastic material, which has a spiral groove molded on the inner face of the two perforated flanges of the reel. These reels are loaded by feeding the film into the open end of the spiral grooves and pushing it forward until the film occupies every loop of the spiral grooves or that number of loops which is sufficient to accommodate the length of the film. A third type of developing tank provides a reel the flanges of which consist of spirally wound metal rods having the innermost loop welded to straight metal rods which provide an open core and which, being bent and welded across the outside of the spiral flanges, secure the flanges in position. These reels are loaded by attaching the film first to the core and then, while bending the film slightly so that it will slip past the edges of the spiral rods, allowing it to expand into position between the spiral rods as the reel is turned.

As will become apparent from the subsequent detailed description, the herein claimed invention eliminates the inherent shortcomings of the afore-described devices which, even in the hands of a skilled operator, are notorious for causing an all too frequent spoilage of film.

Figure 1:
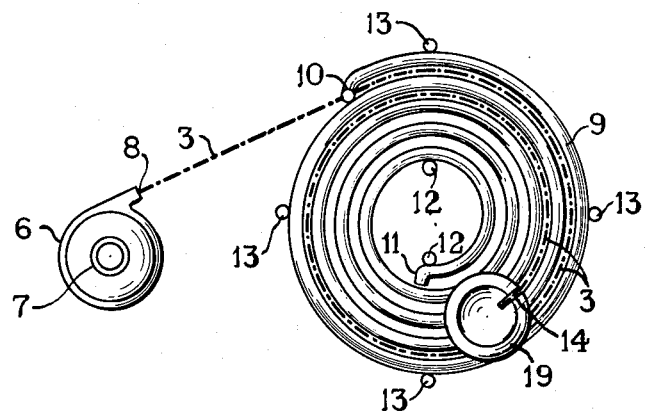
Figure 2:
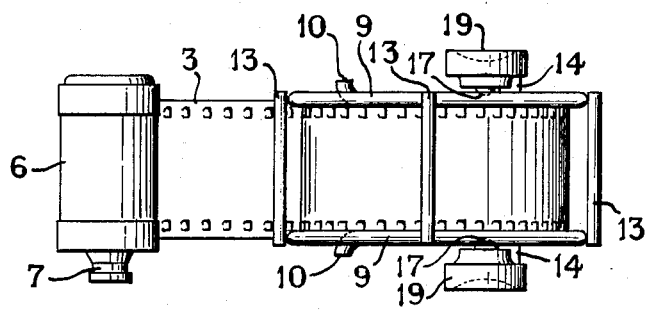
Figure 3:
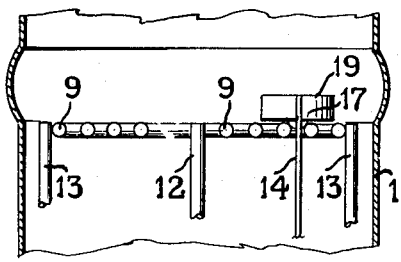
Figure 4:
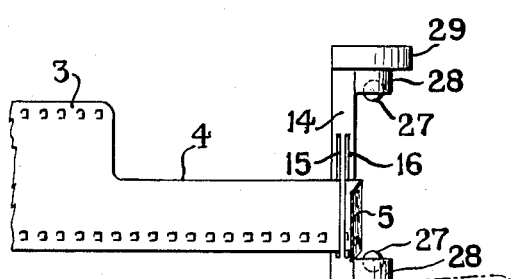
Figures 6, 7:
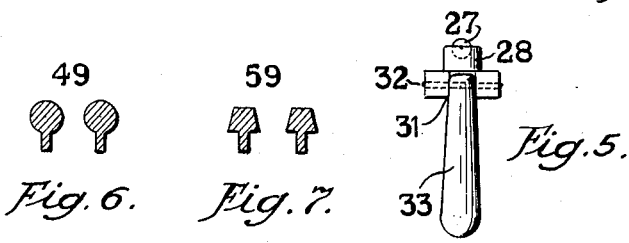
Figure 5:

The present invention is illustrated by the accompanying drawings, in which:

Fig. 1 is a top view of one embodiment of the herein claimed device, depicting the device while it is loaded with a film from a film cartridge, Fig. 2 is a front elevation of the illustration shown in Fig. 1, Fig. 3 is a vertical cross-section, partly cut away, of a film developing tank having a loading device of this invention inserted therein, Fig. 4 is a front elevation of one embodiment of the film guide of this invention, Fig. 5 is another view of the handle of the film guide shown in Fig. 4, and Figs. 6 and 7 are profiles of different embodiments of the spiral flanges comprising the herein claimed loading device.

Referring in more detail to the drawings, Figs. 1 and 2 illustrate a typical roll film 3, wound back after exposure into a film cartridge 6 which has a rotatable core 7 and a slot 8 from which the film usually extends for a length of four to five inches prior to unwinding. As shown, according to this invention, the film is wound into a reel comprising two parallel flanges consisting of spirally wound rods 9. The beginning 10 and the end 11 of these spirally wound rods are preferably bent as illustrated, to confine the path of travel of a film guide, later to be described. By means of core stays, such as the stays 12, the said flanges are suitably spaced to admit and retain, between adjacent loops of the spirals, opposite edges of the film and to assure, while the film is submerged in liquid, after insertion of the loaded reel in a tank 1 (Fig. 3), that adjacent loops of the spirally wound film are sufficiently apart so as not to touch each other and to allow a free flow of liquid therebetween. If desired, the spacing from each other and the rigidity of the spiral flanges can be augmented and secured by stays, such as the stays 13. However, it is usually preferable to select the material and the size of the spirally wound rods so as to provide sufficient rigidity without the said marginal stays.

As shown in Figs. 1 and 2, in loading the reel the film enters into the space between the two outermost loops of the spiral flanges. To pass the film smoothly into the reel, according to this invention there is a film guide provided, the principle of which is shown in detail in Fig. 4. This film guide, being slidingly held between the two flanges, comprises a strip 14, preferably made from metal and having a width which permits insertion thereof between adjacent loops of the spiral flanges and an easy movement in both directions over a path terminated by the bent ends 10 and 11 of the spirals or by any other similarly suitable means.

In order to load the reel with a film, after moving the film guide into a position fixed by the terminal points 10, the beginning 4 of the film 3 is passed through the slots 15 and 16 of the strip 14 and is then sharply bent, as shown at 5. The beginning of films commercially loaded in cartridges is usually cut as shown in Fig. 4, leaving about one-half of the width of the film at one side. The slots 15 and 16 are positioned to receive such a laterally cut film, but they are made sufficiently long to fit the center portion of the beginning of a film which has been cut along both edges.

The strip 14 is cut so as to exceed in length the distance between the two flanges and a stop, such as the knob 19, is fastened at each end of the strip, adjacent to the outer face of the spiral flanges. As illustrated in Figs. 1 and 2, these knobs can be fitted with conchoidal surfaces to provide appropriate depressions for turning the film guide with thumb and middle finger. The stops or knobs should contact the spiral rods with close tolerances in order to avoid lateral movements of the film guide and are preferably provided with contact members such as the hemisphere members 17, to minimize friction when the film guide is turned. Fig. 4 illustrates a further improvement in minimizing friction, by providing casters consisting of the spheres 27, held by the roller bearings 28 underneath the end pieces 29 and 30, respectively. Another modification is shown in Fig. 4, according to which the end pieces are not used for turning the film guide. Instead, the end piece 30 is provided with a slot 31, a pin 32 and a handle 33 for winding the film into the reel. As indicated in the drawing, the handle can be turned into a position parallel to the flanges in order to reduce the space requirements of the reel.

The spirally wound rods illustrated in Figs. 1, 2 and 3 can be of any suitable material, such as metal or plastic. In the alternative, they can advantageously consist of a metal core, covered by plastic material. The flanges formed by these spirally wound rods can be put into the required shape by means of bending, molding and/or machining. The rods can be replaced by spiral bars, such as the bars shown in profile in Figs. 6 and 7, selected from the point of view of causing a minimum of friction and providing, by a recessed pathway, a fixed course for the end members of the film guide.

The reel permits the insertion of the film in the slots of the film guide under light. Although the loading of the film proper must take place in absolute darkness in most instances, by virtue of this invention such loading has become a simple mechanical step which does no longer call for the dactylic skill required for the operation of prior devices of this kind.

Having described my invention, I claim:

1. Loading device for a roll film developing tank, comprising an open core reel adapted to receive a spirally wound photographic film, said reel comprising two parallel flanges consisting of spirally wound rods having the innermost loops of the spirals attached to the end of stays of a length providing the proper distance for holding the edges of said photograph film between adjacent loops of the spirally wound rods constituting said flanges, a film guide of a length greater than the length of said stays inserted parallel to said stays between loops of said spirally wound flanges, means for attaching one end of said photographic film to said film guide, end pieces fastened to said film guide adjacent to the outside facings of said flanges to prevent lateral movements of said film guide and to confine the movements of said film guide into a spiral path from near the periphery of the flanges of said reel to the core and back, hemispheric members attached to said end pieces which hemispheric members, while contacting adjacent loops of said spirally wound rods laterally, fit in the space therebetween, and at least one of said end pieces comprising gripping means for manually moving said film guide along said spiral path.

2. A device according to claim 1, wherein said hemispheric members constitute ball bearings which, while contacting adjacent loops of said spirally wound rods laterally, wound rods laterally, fit in the space therebetween.

3. A device according to claim 1, wherein said end pieces are knobs having conchoidal depressions at the outside surface thereof.

4. A device according to claim 1, wherein the rods constituting said flanges are replaced by spirally wound bars having inside projections for supporting the edges of said photographic film and having an outside contour which permits the hemispheric members attached to said end pieces to contact adjacent loops of said spirally wound bars laterally and to fit in the space therebetween.

References Cited in the file of this patent

UNITED STATES PATENTS

| | | |
|---|---|---|
| 2,498,058 | Woitovitch | Feb. 21, 1950 |
| 2,499,348 | Alberts et al. | Mar. 7, 1950 |